D. F. FESLER.
CHECK.
APPLICATION FILED FEB. 21, 1919.
1,343,865.
Patented June 15, 1920.
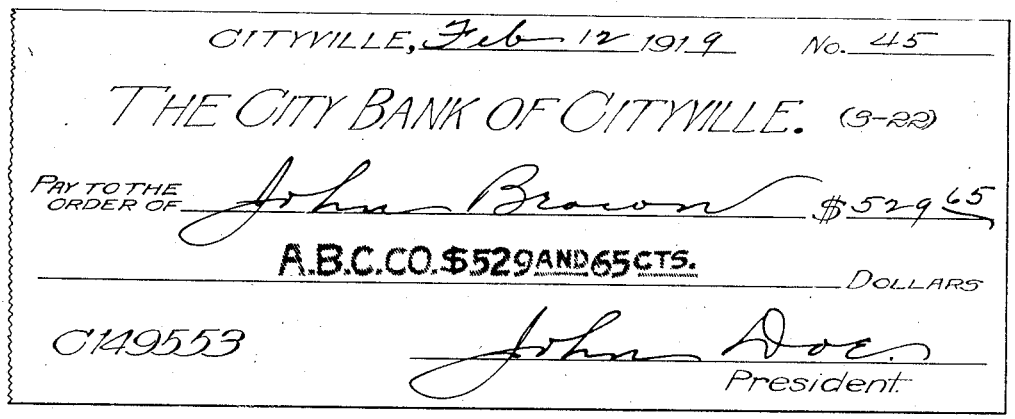

UNITED STATES PATENT OFFICE.

DOUGLAS F. FESLER, OF EVANSTON, ILLINOIS, ASSIGNOR TO HEDMAN MANUFACTURING COMPANY, OF CHICAGO, ILLINOIS, A CORPORATION OF ILLINOIS.

CHECK.

1,343,865. Specification of Letters Patent. Patented June 15, 1920.

Application filed February 21, 1919. Serial No. 278,466.

*To all whom it may concern:*

Be it known that I, DOUGLAS F. FESLER, a citizen of the United States, and resident of Evanston, in the county of Cook and State of Illinois, have invented a certain new and useful Improvement in Checks, of which the following is a full, clear, concise, and exact description, reference being had to the accompanying drawings, forming a part of this specification.

My invention relates to negotiable instruments of obligation, such as bank checks, drafts, etc., and the method of insuring against fraudulent making, raising and duplicating of such instruments.

More specifically the invention relates to instruments of the class described, which have their values printed thereon by a machine of the type commonly known as a check writer or check protector. In order to prevent raising of such instruments, it has been the custom to provide check writing machines with certain type or printing elements, which were used to make an imprint immediately to the left of the character of highest denomination forming part of the figure representing the value of the check. These type or printing elements were common to all machines put on the market by a manufacturer, with the result that every machine had identically the same so-called fraud preventive. For example, if a certain organization wrote all of its checks with the characters " Pay $ " preceding the characters representing the values of the instruments, there was absolutely nothing to prevent the fraudulent making of duplicate instruments, and this for the reason that all machines of the one type were capable of printing similar characters or fraud preventive indicia.

It is one of the objects of the present invention to eliminate the possibility of thus fraudulently duplicating instruments of the class described, and to accomplish this object I propose to provide each check writing machine with certain fraud preventive type or characters which are individual to the drawer and different from the fraud preventive characters of other check writing machines. It will be seen that the likelihood of duplicating an instrument is thus eliminated or reduced to a minimum, since to do so requires the use of the fraud preventive characters which are part of only one machine.

In the preferred form of the invention I propose to utilize certain type or characters which not only function to carry out the object above set forth, but also to act as a valuable advertising feature. For example, the check writing machine of The John Doe Company will be provided with characters which are individual to that company, and which are of themselves valuable as advertising matter, such as the name of the company or a certain mark used on the goods manufactured by that company.

These and other features of my invention will be pointed out more clearly in connection with the accompanying drawing, which illustrates a check made out in accordance with the method of my invention.

Although the drawing shows the fraud preventive legend printed by the check writing machine as taking the place of the amount ordinarily written in longhand, I wish it to be understood that the check may be made out in longhand, as in common practice, and the fraud preventive legend placed anywhere on the check, as obliquely across the face of the check.

The check of my invention has indelibly printed thereon a fraud preventive legend consisting of two kinds of indicia, *i e.*, firstly, indicia that is distinctly individual to the maker of the instrument, as for instance, the name of the maker or his trade-mark, and secondly, indicia representing the value of the check. The check shown in drawing is signed by " John Doe, President," and the indicia "A. B. C. Co.", being individual to the maker of the check, indicates that the check has been drawn against the account of the A. B. C. Co. by its President, John Doe. The indicia " $529 and 65 cts ", represents the value of the check. The indicia "A. B. C. Co." is printed upon the same line with and immediately preceding the indicia " $529 and 65 cts ", the two kinds of indicia together constituting a fraud preventive legend "A. B. C. Co. $529 and 65 cts " which make it impossible to raise the check by adding one or more digits to the printed indicia representing the value of the check without removing all or a part of the indicia "A. B. C. Co.". Since the indicia "A. B. C. Co." is an inscription which can be duplicated only by means of the machine possessed by the maker, it will be seen that the likelihood of this form of check being raised is reduced to a minimum. The use of checks embodying the herein described fraud preventive legend not only protects the drawer against check raising but further, to a very large extent protects him against forgeries. Ordinarily a bank depends solely upon the maker's signature in determining whether a check is genuine or a forgery. When the check of my invention is employed the bank and the drawer are doubly safe-guarded against bogus checks because, before the check can be passed for payment by the bank upon which it is drawn, it must stand comparison with the bank's records of not only the maker's signature but also with the bank's record sample of that portion of the fraud preventive legend which can be duplicated only by the check protecting machine of the maker. The fraudulent reproduction of a signature is not a difficult matter to accomplish but the unauthorized reproduction of a name or trademark indelibly printed by a check protector printing element of which there is only one in existence is a matter which cannot be successfully accomplished.

The advertising feature of the check is, of course, apparent from an inspection of the drawing. Checks made out by an organization will possess certain individuality and will be instantly identified as having been issued by them.

Having thus described my invention, what I claim as new and desire to secure by Letters Patent is:

A device of the class described, having printed and serrated thereon advertising indicia pertaining to and individual to the party whose account is to be charged by the instrument and similarly printed and serrated indicia representing the value of the instrument, the advertising indicia being on the same line with and located so close to the valuation indicia that the two forms of indicia together constitute a single continuous legend, which legend, by its continuity, insures that the legend, in its entirety, was placed upon the instrument by the drawer thereof.

In witness whereof I hereunto subscribe my name this 17th day of February, 1919.

DOUGLAS F. FESLER.

Witnesses:
 ROBERT F. BRACKE,
 EDNA V. GUSTAFSON.